(12) United States Patent
Foslien

(10) Patent No.: US 8,013,864 B2
(45) Date of Patent: Sep. 6, 2011

(54) METHOD AND SYSTEM FOR VISUALIZING MULTIVARIATE STATISTICS

(75) Inventor: Wendy K. Foslien, Woodbury, MN (US)

(73) Assignee: Honeywell International Inc., Morristown, NJ (US)

( * ) Notice: Subject to any disclaimer, the term of this patent is extended or adjusted under 35 U.S.C. 154(b) by 1041 days.

(21) Appl. No.: 11/897,408

(22) Filed: Aug. 30, 2007

(65) Prior Publication Data
US 2009/0021517 A1 Jan. 22, 2009

(51) Int. Cl.
*G06T 11/20* (2006.01)
*G09G 5/00* (2006.01)
*G06K 9/00* (2006.01)
*G06K 9/62* (2006.01)
*G05B 11/01* (2006.01)
*G06F 19/00* (2006.01)
*G01D 1/00* (2006.01)
*G09G 1/28* (2006.01)
*H03F 1/26* (2006.01)

(52) U.S. Cl. ........ 345/589; 345/440; 345/619; 345/673; 345/22; 382/165; 382/228; 700/14; 700/15; 700/91; 702/1; 702/127; 702/179; 702/194

(58) Field of Classification Search ................ 702/1, 67, 702/79, 85–86, 108–109, 146–147, 127, 702/165, 176, 193, 179–183, 194–199, 84, 702/185; 700/1, 14–15, 90–91, 93, 108, 700/174, 34, 51, 110, 244, 202–205; 345/590, 345/593, 597, 606, 619, 643, 440, 673, 440.2, 345/22; 714/25, 57, 100, 47
See application file for complete search history.

(56) References Cited

U.S. PATENT DOCUMENTS

| 5,471,194 | A | 11/1995 | Guscott ........................ 340/511 |
| 5,796,353 | A | 8/1998 | Whitehead ............... 340/870.01 |
| 6,697,810 | B2 | 2/2004 | Kumar et al. .................... 707/10 |
| 6,760,687 | B2 | 7/2004 | Apel et al. ..................... 702/187 |
| 6,970,103 | B2 | 11/2005 | Bortolotto ..................... 340/937 |
| 7,096,153 | B2 | 8/2006 | Guralnik et al. ............. 702/179 |
| 7,150,044 | B2 | 12/2006 | Hoefelmeyer et al. ......... 726/23 |
| 7,203,620 | B2 | 4/2007 | Li ................................. 702/181 |
| 2004/0049729 | A1* | 3/2004 | Penfield ........................ 715/503 |
| 2005/0021324 | A1 | 1/2005 | Brants et al. ..................... 704/9 |

(Continued)

FOREIGN PATENT DOCUMENTS
WO WO 2007/047868 A2 4/2007

*Primary Examiner* — Wesner Sajous
(74) *Attorney, Agent, or Firm* — Kermit D. Lopez; Luis M. Ortiz; Ortiz & Lopez, PLLC

(57) ABSTRACT

A method, apparatus and module for visualizing multivariate statistical measurements. A processing system receives multivariate statistical output data, such as scores or contributions from a multivariate statistical model and renders the multivariate statistical output data as a function of time as a color map on a display. Each multivariate statistical output data can be obtained at each time sample and rendered as a corresponding color patch on the display. The color, height and width of the corresponding color patch can be adjusted to correspond to the magnitude of the output data, the length of time of the time sample and the number of the output data. Normalized scores/contributions at each time sample can be rendered as a corresponding color patch on the display in response to said Q statistic exceeding said predetermined threshold.

18 Claims, 6 Drawing Sheets

U.S. PATENT DOCUMENTS

| | | | |
|---|---|---|---|
| 2005/0021490 A1 | 1/2005 | Chen et al. | 707/1 |
| 2005/0033481 A1* | 2/2005 | Budhraja et al. | 700/286 |
| 2007/0005296 A1* | 1/2007 | Beresniewicz et al. | 702/181 |
| 2007/0038653 A1 | 2/2007 | Li et al. | 707/100 |
| 2007/0061023 A1* | 3/2007 | Hoffberg et al. | 700/83 |
| 2007/0088534 A1 | 4/2007 | MacArthur et al. | 703/17 |
| 2007/0094729 A1 | 4/2007 | Hoefelmeyer et al. | 726/23 |
| 2007/0124113 A1 | 5/2007 | Foslien et al. | 702/185 |
| 2008/0276137 A1* | 11/2008 | Lin et al. | 714/57 |
| 2009/0299646 A1* | 12/2009 | Shams et al. | 702/19 |
| 2009/0299695 A1* | 12/2009 | Subbu et al. | 702/181 |
| 2010/0100250 A1* | 4/2010 | Budhraja et al. | 700/291 |

\* cited by examiner

METHOD AND SYSTEM FOR VISUALIZING MULTIVARIATE STATISTICS

BRIEF SUMMARY

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

According to one aspect, a method for visualizing multivariate statistical measurements implemented by a processing system comprises receiving multivariate statistical output data from a multivariate statistical model, such as a Principal Component Analysis or Partial Least Squares model. The multivariate statistical output data can be raw and/or post processed data. The method includes rendering as a color map on a display the multivariate statistical output data as a function of time.

Receiving the multivariate output data and rendering as a color map on a display the multivariate statistical output data as a function of time enables a process being modeled to be monitored by a human operator and visualized on effective graphical displays to assist the human operator in better analyzing and understanding the outputs and in more effectively reviewing the performance of the process being monitored.

Rendering as a color map on a display the multivariate statistical output data as a function of time can comprise obtaining multivariate statistical output data at each time sample or multiple time samples and rendering multivariate statistical output data at each time sample or multiple time samples as a corresponding color patch on the display.

Rendering multivariate statistical output data at each time sample or multiple time samples as a corresponding color patch on the display can include mapping the magnitude of multivariate statistical output data at each time sample or multiple time samples to a corresponding color or range of colors; and adjusting the color of the corresponding patch to the mapped color or range or colors.

Rendering multivariate statistical output data at each time sample or multiple time samples as a corresponding color patch on the display can include mapping the length of each time sample or multiple time samples to a corresponding patch height; and adjusting the height of the corresponding patch to the mapped patch height.

Rendering multivariate statistical output data at each time sample or multiple time samples as a corresponding color patch on the display can include mapping the number of multivariate statistical output data covered by the patch to a corresponding patch width; and adjusting the width of the corresponding patch to the mapped patch width.

Multivariate statistical output data can comprise at least one multivariate statistical output data selected from the group consisting of contributions to an overall statistical measure, scores, summary statistics, Q statistic and statistical mismatch.

Multivariate statistical output data can comprise at least one multivariate statistical output data selected from the group consisting of absolute, normalized and/or averaged multivariate statistical output data.

Rendering multivariate statistical output data as a function of time as a corresponding color patch on the display can comprise rendering each absolute value of normalized scores/contributions at each time sample or multiple time samples as a corresponding color patch on the display in response to the Q statistic exceeding the predetermined threshold.

Multivariate statistical output data can comprise at least one Principal Component Analysis (PCA)/Partial Least Squares (PLS) output data selected from the group consisting of scores normalized using a threshold function based on the Eigen values of the multivariate statistical model and contributions normalized by calculating the percent contribution.

Receiving multivariate statistical output data from multivariate statistical models can comprise receiving raw data and receiving post processed data from a Principal Component Analysis (PCA) or Partial Least Squares (PLS) model, the raw data comprising contributions/scores and the post processing data comprising averaged and/or normalized the scores/contributions; and wherein rendering the multivariate statistical output data as a function of time as a color map on a display comprises: generating a display graphic having a first axis representing the normalized score/contribution values and a second axis representing elapsed time in time steps rendering on the display graphic each normalized/score contribution value at each time sample or multiple time samples as a corresponding color patch extending along the first axis; at each time step, mapping absolute score/contributions to corresponding color values in response to the Q or $T^2$ statistic exceeding a predetermined threshold.

According to another aspect, an automated system for visualizing multivariate statistical measurements comprises a processor operably coupled to a display monitor. The processor is configured to receive multivariate statistical output data from a multivariate statistical model. The multivariate statistical output data can be raw and/or post processed data. The processor is configured to render as a color map on the display the multivariate statistical output data as a function of time.

The processor can be configured to map the magnitude of the multivariate statistical output data at each time sample or multiple time samples to a corresponding color value or range of color values; adjust the color of the corresponding patch to the mapped color value or range of color values; map the length of each time sample or multiple time samples to a corresponding patch height; adjust the height of the corresponding patch to the mapped patch height; map the specific multivariate statistical output data covered by the patch to a corresponding patch width; and adjust the width of the corresponding patch to the mapped patch width.

The multivariate statistical model can comprise a Principal Component Analysis (PCA) or Partial Least Squares (PLS) model. The multivariate statistical output data can comprise at least one multivariate statistical output data selected from the group consisting of absolute, normalized, and averaged multivariate statistical output data, contributions to an overall statistical measure, scores, summary statistics, and Q statistic statistical mismatch.

According to yet another aspect, a color map display rendering module which, when run on a computer system, implements a method for visualizing multivariate statistical measurements on a display monitor, the method comprising: receiving multivariate statistical output data from a multivariate statistical model, the multivariate statistical output data comprising raw and/or post processed data; and rendering as a color map on a display the multivariate statistical output data as a function of time.

Rendering as a color map on a display the multivariate statistical output data as a function of time can comprise obtaining multivariate statistical output data at each time sample or multiple time samples; rendering multivariate statistical output data at each time sample or multiple time samples as a corresponding color patch on the display.

Rendering multivariate statistical output data at each time sample or multiple time samples as a corresponding color patch on the display can include mapping the magnitude of multivariate statistical output data at each time sample or multiple time sample to a corresponding color or range of colors; adjusting the color of the corresponding patch to the mapped color or range of colors; mapping the length of each time sample or multiple time samples to a corresponding patch height; adjusting the height of the corresponding patch to the mapped patch height mapping the number of multivariate statistical model outputs covered by the patch to a corresponding patch width; and adjusting the width of the corresponding patch to the mapped patch width.

The multivariate statistical model can comprise a Principal Component Analysis (PCA) or Partial Least Squares (PLS) model; and each multivariate statistical output data can comprise at least one multivariate statistical output data selected from the group consisting of absolute, normalized and averaged scores/contributions to an overall statistical measure, scores, summary statistics, Q statistic and statistical mismatch, scores normalized using a threshold function based on the Eigen values of the multivariate statistical model, and contributions normalized by calculating the percent contribution.

The multivariate statistical model can comprise a Principal Component Analysis (PCA) or Partial Least Squares (PLS) model and each multivariate statistical output data can comprise at least one multivariate statistical output data selected from the group consisting of wherein the multivariate statistical output data comprises absolute values of normalized scores/contributions, and further comprising rendering each absolute values of normalized scores/contributions at each time sample as a corresponding color patch on the display in response to the Q statistic exceeding the predetermined threshold.

Receiving multivariate statistical output data from a multivariate statistical model can comprise receiving raw data and processed data from a Principal Component Analysis (PCA) or Partial Least Squares (PLS) model, the raw data comprising contributions/scores and the post processed data comprising averaged and/or normalized the scores/contributions; and wherein rendering the multivariate statistical output data as a function of time as a color map on a display comprises: generating a display graphic having a first axis representing the normalized score/contribution values and a second axis representing elapsed time in time steps, rendering on the display graphic each normalized/score contribution value at each time sample as a corresponding color patch extending along the first axis; at each time step, mapping absolute score/contributions to corresponding color value in response to the Q statistic exceeding a predetermined threshold

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment of the present invention and are not intended to limit the scope of the invention.

The method and system for visualizing multivariate statistics according to the illustrative embodiments provide an approach in which outputs from a multivariate statistical model of a process to be monitored by a human operator can be visualized in effective graphical displays to assist the human operator in better analyzing and understanding the outputs and in more effectively reviewing the performance of the process being monitored. Furthermore, the approach enables visualization of the contributions to statistical anomalies as a function of time facilitating easier and more efficient post analysis of the industrial data and therefore more effective incident review.

Figure 1:
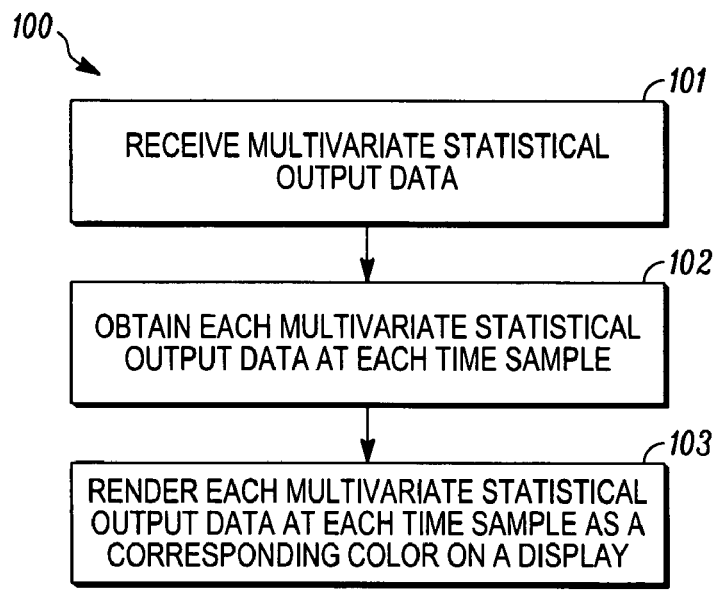
FIG. 1 illustrates a flow diagram generally outlining a method of visualizing multivariate statistics according to a preferred embodiment.
Figure 2:
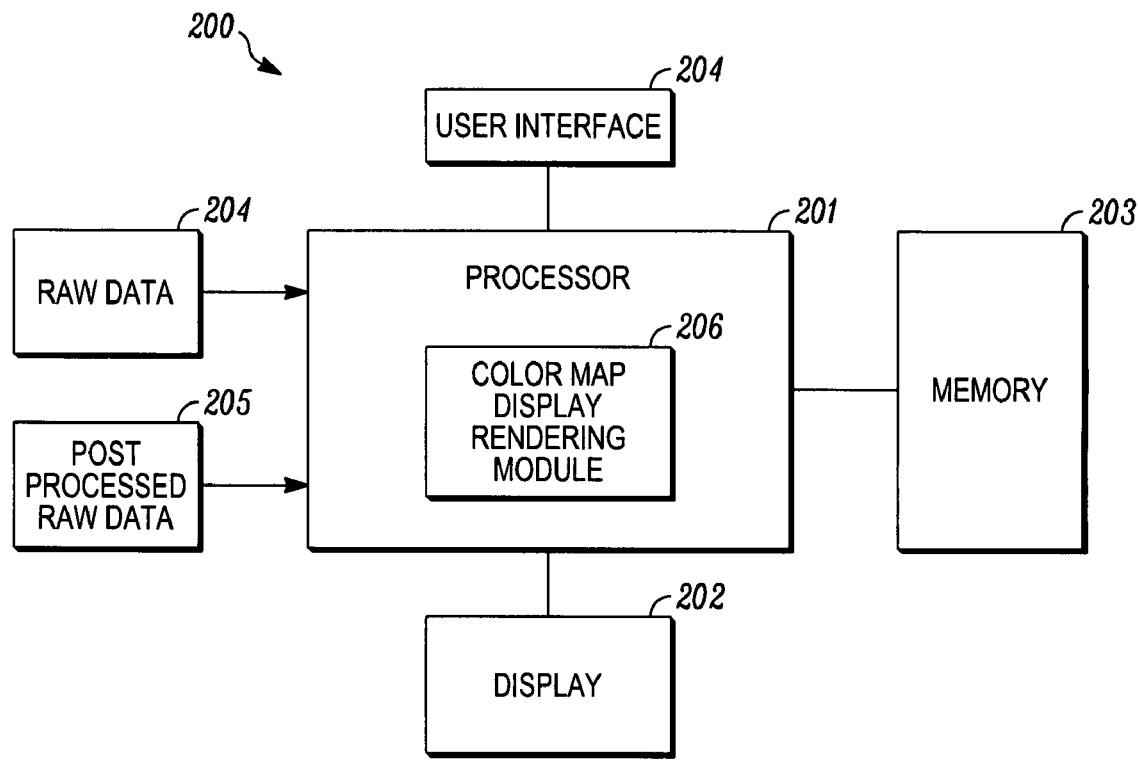
FIG. 2 illustrates a block diagram of a typical data processing system in which the method of visualizing multivariate statistics of FIG. 1 can be implemented according to one embodiment.

Referring to FIG. 1 of the accompanying drawings, which illustrates a flow diagram generally outlining a method of visualizing multivariate statistical outputs according to one embodiment, and FIG. 2, which illustrates a typical automated system in which the method of FIG. 1 can be implemented; a automated system 200, which is suitable for implementing the method 100, has a processor 201 operably connected to memory 203 and a display 202. A user interface 204 is operably connected to the processor to allow a human operator to manipulate the processor, memory, display and other components of the automated system as required.

Processor 201 may be any kind of computer processor unit (CPU) based system such as a personal computer (PC), or other microprocessor based system such as a digital signal processor based system. Alternatively, some or all of the processor functionality can be implemented as analogue or digital circuitry without the use of microprocessor. The display may be any type of graphical monitor connected either locally or remotely via a network, such as the internet. In the automated system 200 of the illustrative embodiment, the graphical monitor is a color monitor to enable the use of a color spectrum to compare outputs from the model. Although less effective, the graphical monitor can alternatively be a black and white or grayscale scheme graphical monitor or display.

An operating system runs on the processor 201 and may be a commercially available operating system. Instructions for the operating system and applications or programs are stored in storage devices, such as a hard drive.

A color map display rendering module 206 is configured such that, when the module is run on the processor 201, multivariate statistical output data 204,205 received by the processor 201 is rendered as a color map on the graphical display 202 in an effective manner, as will be described in more detail below.

The multivariate statistical data 204, 205 can be raw data 204 and processed data 205. The raw data 204 can be received from the output of a multivariate statistical model module The raw data 204 are outputs from a multivariate statistical model, such as for example regression analysis, principal component analysis, partial least squares, linear discriminant analysis, discriminant function, logistic regression, multivariate analysis of variance, artificial neural networks extended regression methods and canonical correlation analysis. The post processed data 205 can be provided by means of a post processing algorithm, such as the post processing algorithm of Honeywell Inc disclosed in US patent application No. 20070088534, entitled "System, method, and computer program for early event detection", issued to MacArthur et al. on Apr. 19, 2007, and which is incorporated herein by reference. The multivariate statistical model module and/or post processing algorithm can be executed for example on an external system or on the automated system 200.

Referring to the flow chart of FIG. 1 generally outlining method 100, the processor 201 receives multivariate statistical outputs data 204, 205, which can be raw data 204 and post processed raw data 205, thereby performing process step 101. The color map display rendering module 206 running on the processor 201 obtains multivariate statistical output data at each time sample or multiple time samples (process step 102) and then renders multivariate statistical output data at each time sample or multiple time samples as a corresponding color or range of colors on a graphical display 202, as indicated in process step 103.

Figure 7:
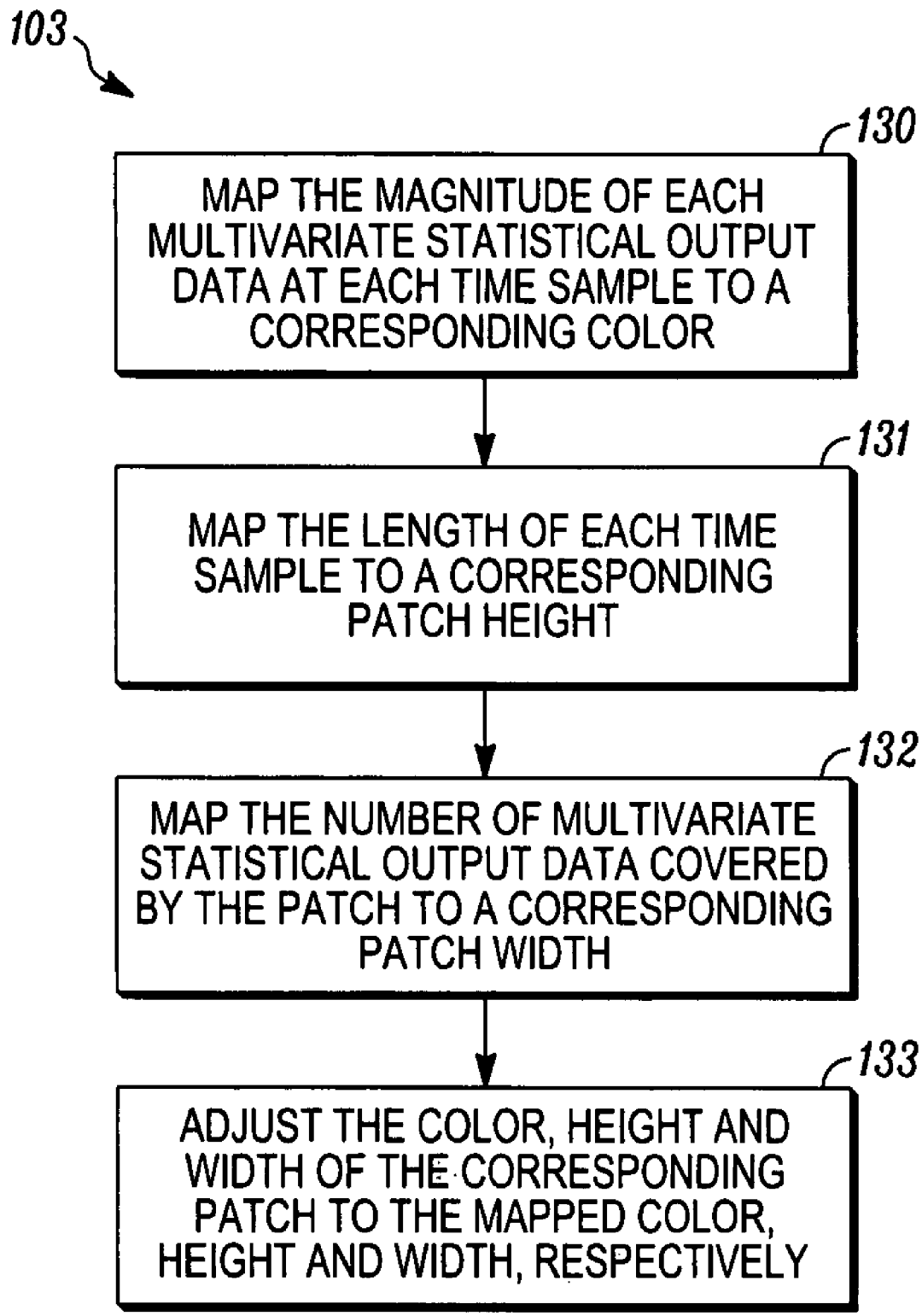
FIG. 7 illustrates a flow diagram showing in more detail the process step 103 of the method of FIG. 1 according to one embodiment.

As shown in FIG. 7, which illustrates a flow chart detailing process step 103 of FIG. 1 according to an embodiment, in order to render each multivariate statistical output data at each time sample as a corresponding color on the graphical display, color rendering module 206 maps the magnitude of each multivariate statistical output data at each time sample to a corresponding color according to a user specified color map (process step 130). The rendering module 206 can also map the length of each time sample to be covered by a patch of the color map to a corresponding height (process step 131) and map the number of multivariate statistical output data to be covered by the patch to a corresponding patch width (process step 132). The color rendering module 206 then causes processor 201 to adjust the color, height and width of a corresponding patch being rendered on the display to the mapped color, height and width, respectively (process step 133).

The height of a patch represents the time covered by the patch, the color of the patch represents the magnitude of the multivariate statistical data, and the width is simply proportional to the number of the multivariate statistical data in the model. Each patch is a segment, portion, region or cell of the color map. An example of the data covered by a patch might include the residual error for each modeled variable, or the projection to the model plane (score) in the case of a principal component model. As will be explained in more detail below, the normalized score is mapped to a range of colors. For example, a color map can be defined with 256 entries, each entry having a red, green and blue value to define the color. A standardized range can also be defined, such as −3 to +3 for the score values; or a standardized range of 0 to 100 for contributions to the Q statistic/residual error. At each time step, the standardized scores or contributions are received and the identity of the corresponding entry in the color map determined. The red/green/blue entry in the color map defines the color of the patch.

An embodiment of a method of visualizing multivariate statistical outputs implemented in the automated system of FIG. 2 will now be described in more detail with reference to FIG. 3, which illustrates a flow diagram of a method 300 of visualizing multivariate statistical score values from a principal component analysis model according to one embodiment, and FIG. 4, which illustrates an exemplary screen shot of a typical scores color map display rendered by the method of FIG. 3. In FIG. 4, colors are represented by shaded areas. Method 300 is initiated by the processor 206 receiving raw data 204 representing the multivariate statistical outputs (process step 301) and receiving post processed raw data 205 in the form of score values, averaged for each predetermined time interval and normalized using a thresholding function based on Eigen values of the underlying statistical model (step 302). Score values are averaged over time windows and also normalized because of the volume of data and desire to see an overview of the evolving event. Method 300 can, however, be performed without averaging and/or normalizing of raw data 205 depending on the type of multivariate statistical model and for models running at long time intervals.

The color map display rendering module 206 generates the display graphic having an X-axis representing score values and a Y-axis representing elapsed time as time steps subdivided into subsections, as indicated in process step 303. In the illustrative embodiment, the generated display graphic is a two dimensional (2D) representation. The time parameter evolves along the Y-axis from the bottom to the top of the display graphic, as shown for example in the screen shot of the exemplary scores color map of FIG. 4. However, other representations of the evolution of time along the Y-axis are possible. For example, the time parameter can instead evolve from the top to the bottom of the y-axis of the display graphic. The color map rendering module generates each time step on the Y axis as a time slice extending along the length of the X axis. Each time slice is further subdivided down into subsections representing contributions to an overall statistical measure. For example, in the screen shot of FIG. 4, each time subsection is represented by the color map rendering module as elapsed 1 minute periods.

The color map rendering module 206 plots on the display graphic the normalized score values as a function of time, as indicated in process step 304. At each time sample, the color map rendering module represents the absolute score values as a corresponding color on the display graphic in response to the Q statistic exceeding a predetermined threshold, as indicated in process step 305. Each score value at a particular time sample on the Y-axis is represented by the color map rendering module 206 as a color patch which is a rectangular slice of color extending in the direction of the X axis. To this end, the color map rendering module obtains each score value at each time sample; maps each score value to the user defined color map, and shades each patch with the corresponding mapped color. The height of the patch represents the time covered by the patch, the color of the patch represents the magnitude of the score, and the width is simply proportional to the number of scores in the model. For example, a score value of 2.9 at time 0.00 on the Y-axis is represented by a patch of color which extends along the X-axis from score value 2 to score value 3 and which has a thickness equivalent to 1 minute interval on the Y-axis. The value of 2.9 is mapped to a specified color in the color map, and this color is used to shade the patch.

However, the color map rendering module can represent the score value in other formats. For example, the patch need not be rectangular; it need not have a single uniform color across the height of the patch but could instead have a range of colors mapping multiple samples across the patch. By way of example, a color map can be employed in which low score values are shown as blue and increasing values transition toward red, i.e. blues-greens-yellows-oranges-reds Representing each score value at each time sample as a corresponding color on the color map display provides a visualization of the multivariate statistical outputs which shows the human operator which principal components are consistently contributing to the overall statistical variability measure and also how consistent this contribution is. For example, in the screen shot of the exemplary color map of FIG. 4, the display shows the operator that principal component 5 is very strong and a consistent contributor over the time shown in the display. The method of visualizing the multivariate outputs therefore enables evolution of the statistical measurements of a process normality as a function of time to be effectively monitored by a human operator.

Another embodiment of the method of visualizing multivariate statistical outputs, which can be implemented in the automated system of FIG. 2, will now be described with reference to FIG. 5, which illustrates a flow diagram of the method 500 of visualizing PCA multivariate statistical variable contributions to overall statistical mismatch according to another embodiment, and FIG. 6, which illustrates a screen shot of an exemplary contributions to model mismatch color map rendered by the method of FIG. 6. In FIG. 6, colors are represented by shaded areas. Method 500 is initiated by the processor 201 receiving raw data 204 representing the multivariate statistical outputs (process step 501) and processed data 205 representing calculated percent contribution of each tag or variable to the Q statistic (normalized individual tag or variable contribution index values) at each time step (process step 502). Tags or variables are commonly used to describe measurements in the process industries.

The color map rendering module 206 generates a display graphic having an X-axis representing tag contribution index and a Y-axis representing elapsed time, as indicated in process step 503. The Y-axis represents time evolving from top to bottom whereas the X axis corresponds to contribution tags rather than scores shown in the screen shot of the exemplary color map of FIG. 4. However, other representations of the evolution of time along the Y-axis are possible. For example, the time parameter can instead evolve from the top to the bottom of the Y-axis of the display graphic. The color map rendering module 206 generates each time step on the Y-axis extending along the length of the X-axis. Each time sample is further subdivided down into subsections representing contributions to an overall statistical measure. In this embodiment, the measure is the distance from the model plane as defined by the Q statistic, and each of the subsections represents residual errors for individual model tags (variables). For example, in the screen shot of FIG. 6, each time sample is represented by the color map rendering module as elapsed 15 minute periods. In this case, the measure is the distance from the model plane as defined by the Q statistic, and each of the subsections represents residual errors for individual model tags (variables).

The color map rendering module 206 plots on the display graphic the normalized contribution index values, that is, the percent contribution of each tag to Q statistic, as a function of time, as indicated in process step 504. In this particular embodiment, each tag value at a particular time sample on the Y-axis is represented by the color map rendering module as a color patch which extends in the direction of the X axis from the tag value it represents to the next tag value of the X-axis. However, the color map rendering module can represent the tag values in other formats. As described previously, the patch need not be rectangular; it need not have a single uniform color across the height of the patch but could instead map multiple samples across the patch.

At each time sample, the display rendering module 206 renders absolute tag contribution index value as a corresponding color on the graphical display in response to the Q statistic exceeding a predetermined threshold, as indicated in process step 505. For example, a grey scale color map can be employed in which the score values ranging from low to high are represented by shades of grey ranging from black to white as shown in FIG. 6. Preferably, a color map can be employed in which low score values are shown as blue and increasing values transition toward red, i.e. blues-greens-yellows-oranges-reds Rendering at each time sample each absolute tag contribution index value as a corresponding color intensity on a graphical display according to the method of the embodiment, provides a visualization of the multivariate output statistics which effectively displays to the human operator the consistent contribution of certain tags to the Q statistic, and the progression of that consistency over time.

In prior methods and systems for displaying multivariate statistical outputs, assessment of consistent contribution of certain tags to the Q statistic and progression of consistency over time is difficult to assess because the human operator is required to look at snapshots of bad actors at a single time slice. In contrast, the method of visualizing multivariate statistical outputs of the illustrative embodiment provides a visual assessment of the distribution of bad actors over the entire incident which facilitates assessment of whether the model is accurately reflecting the performance of the unit performing the process being monitored.

An example of an incident review of a typical engineering process and the visualization for the post analysis of the model output using the methods and systems of visualizing the multivariate statistical outputs of the illustrative embodiments will now be described. A general description of the incident analyzed using the invention is as follows.

An off spec incident occurred in an industrial plant monitored by a multivariate statistical model. The duration of the most significant part of the incident was approximately nine hours, although the process remained as less than optimal production after the nine hour period.

The incident began with a feed rate reduction with the process already operating at low throughput. The production efficiency became very poor because of temperature distribution problems. System pressure became unstable during the incident as well. The process was normally controlled by a multivariable process controller, but the severity of the incident precluded use of the controller. The multivariate statistical model identified the incident early and the model identified the changing nature of the problem as the incident progressed. With the existing toolset, an operator monitoring the process would need to continually compare values with previous observations. This is a difficult task to perform, and the automated system and method for visualizing multivariate statistics of the illustrative embodiments assist in monitoring the changing nature of the incident.

Example 1

Scores Color Map

Figure 3:
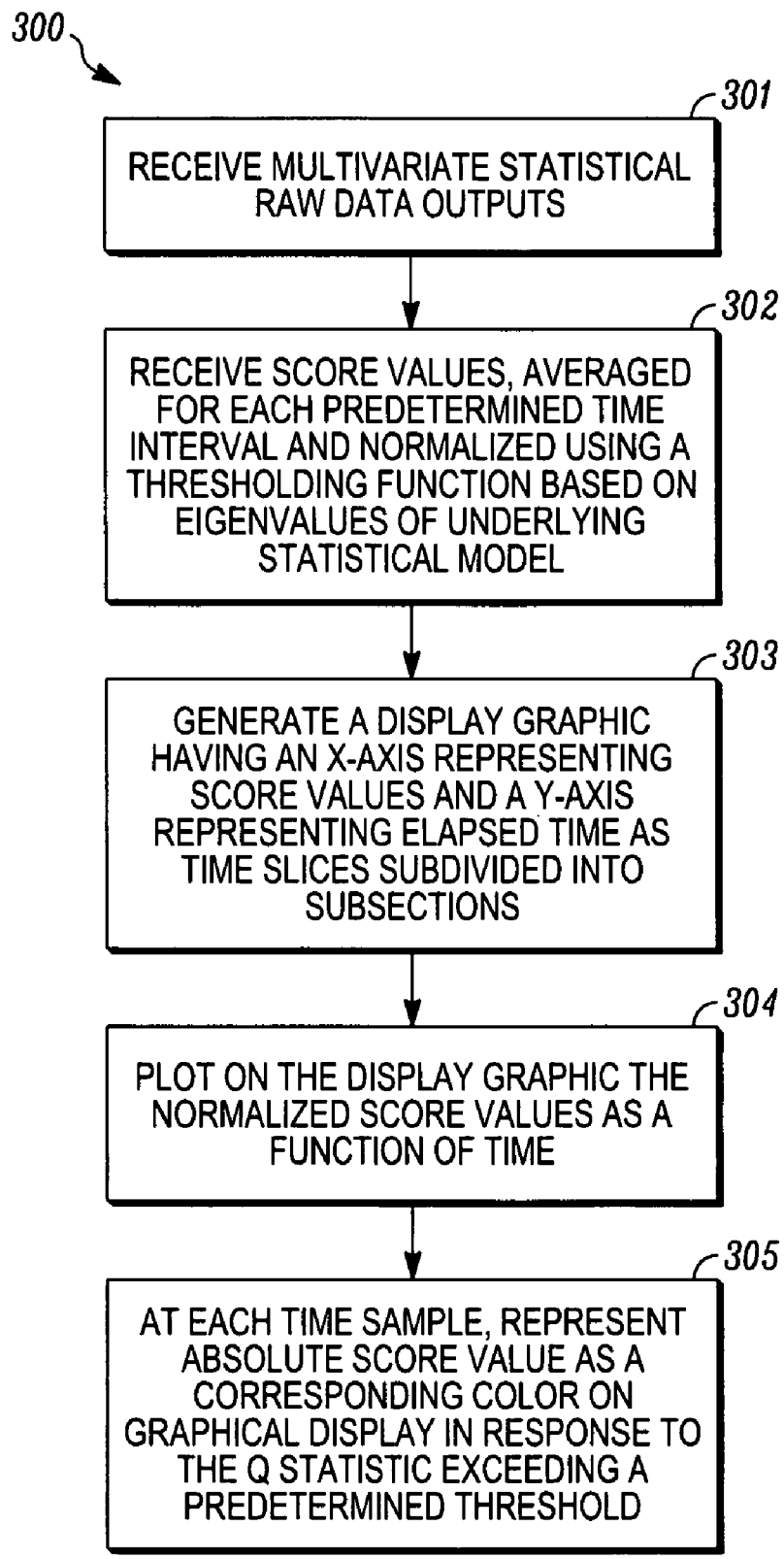
FIG. 3 illustrates a flow diagram of a method of visualizing multivariate statistical score values from a principal component analysis (PCA) model according to one embodiment.
Figure 4:
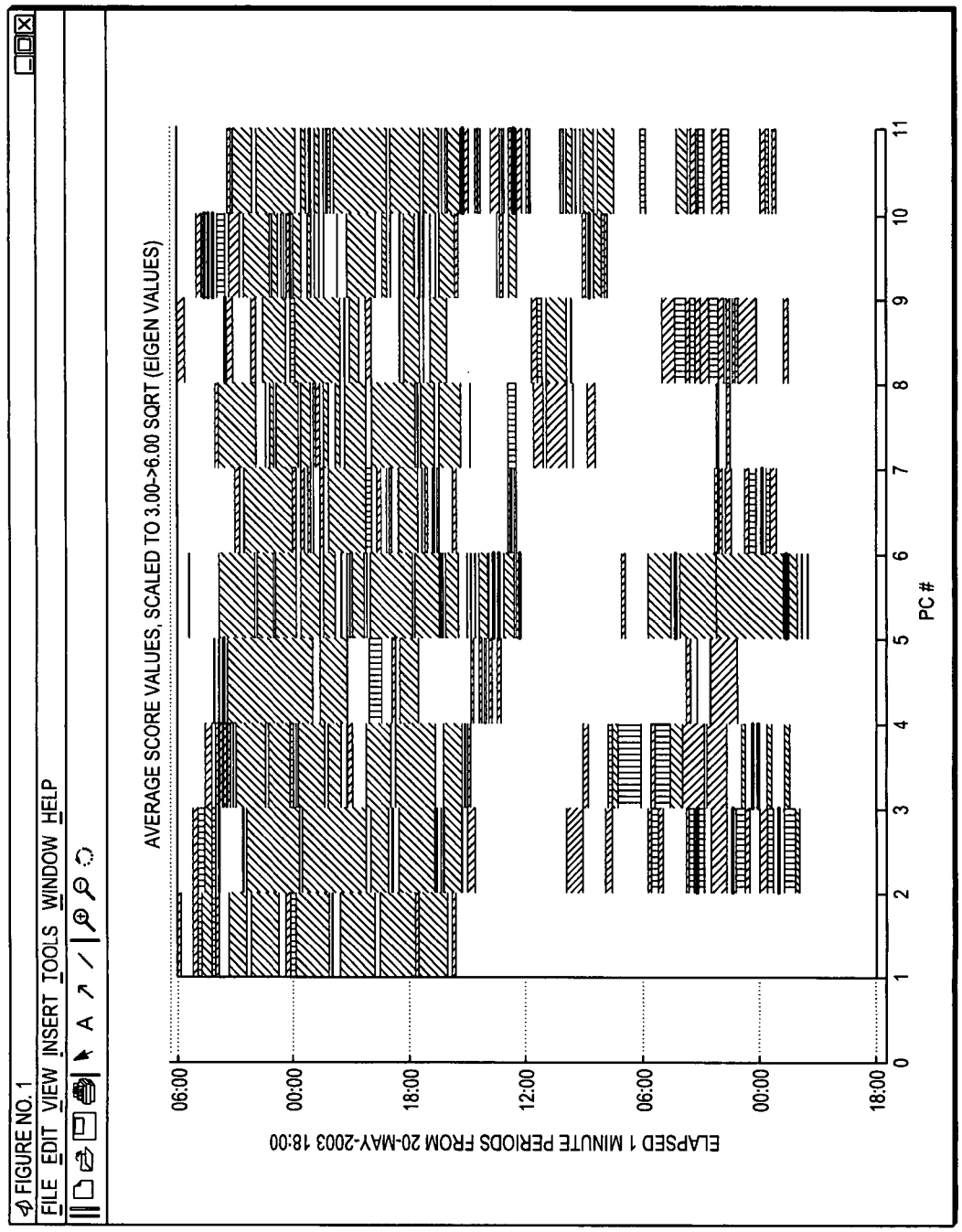
FIG. 4 illustrates a screen shot of an exemplary scores color map display rendered utilizing the method of FIG. 3.

Method 300 of FIG. 3 is performed using the data automated system of FIG. 2 in which the multivariate statistical raw data received by the automated system is the raw data collected during the aforementioned example incident from sensors of the processes. The processor is configured to operate using a Windows based operating system and an environment such as Matlab, for making calculations and rendering the display. Matlab is a Registered Trademark of MathWorks, Inc, Cochituate Place 24 Prime Park Way, Natick, Mass. The color map display rendering module 206, which is in the form of appropriate source code, runs on the processor to render the scores color map 400 of FIG. 4 which shows the evolution of the scores during the incident. Thus, we can see that the rate cut begins about $\frac{1}{10}$ of the distance from the X-axis, according to the timeline in the previous paragraph. The scores are averaged in 15 minute windows. The received post processed data represented average score values, normalized or scaled to using the nominal variability identified in the model. In the case of a PCA model, this nominal variability is expressed in the Eigen values associated with each principal component.

As can be seen from the screen shot of FIG. 4, the rendered scores color map shows a process operator that principal component 5 is a very strong and consistent contributor and also that scores 1, 7 and 9 have little contribution at the outset of the incident. The color map also shows the human operator that about midway up the x axis, the situation in the unit starts getting progressively worse, and by 4 pm we are most likely outside of the linear range of the model.

Example 2

Contributions to Model Mismatch Color Map

Figure 5:
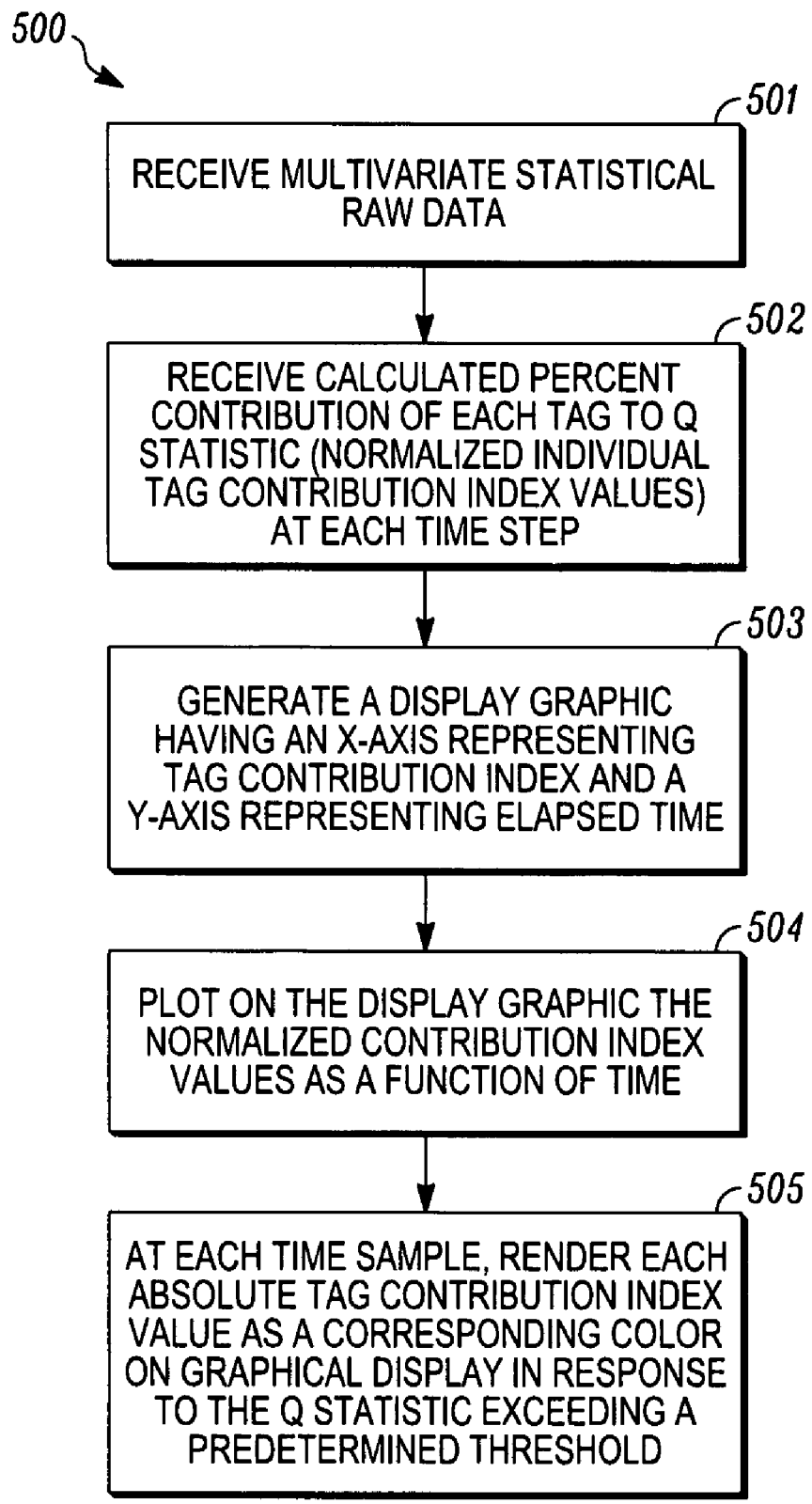
FIG. 5 illustrates a flow diagram of a method of visualizing multivariate statistical residual errors from a PCA model according to another embodiment.
Figure 6:
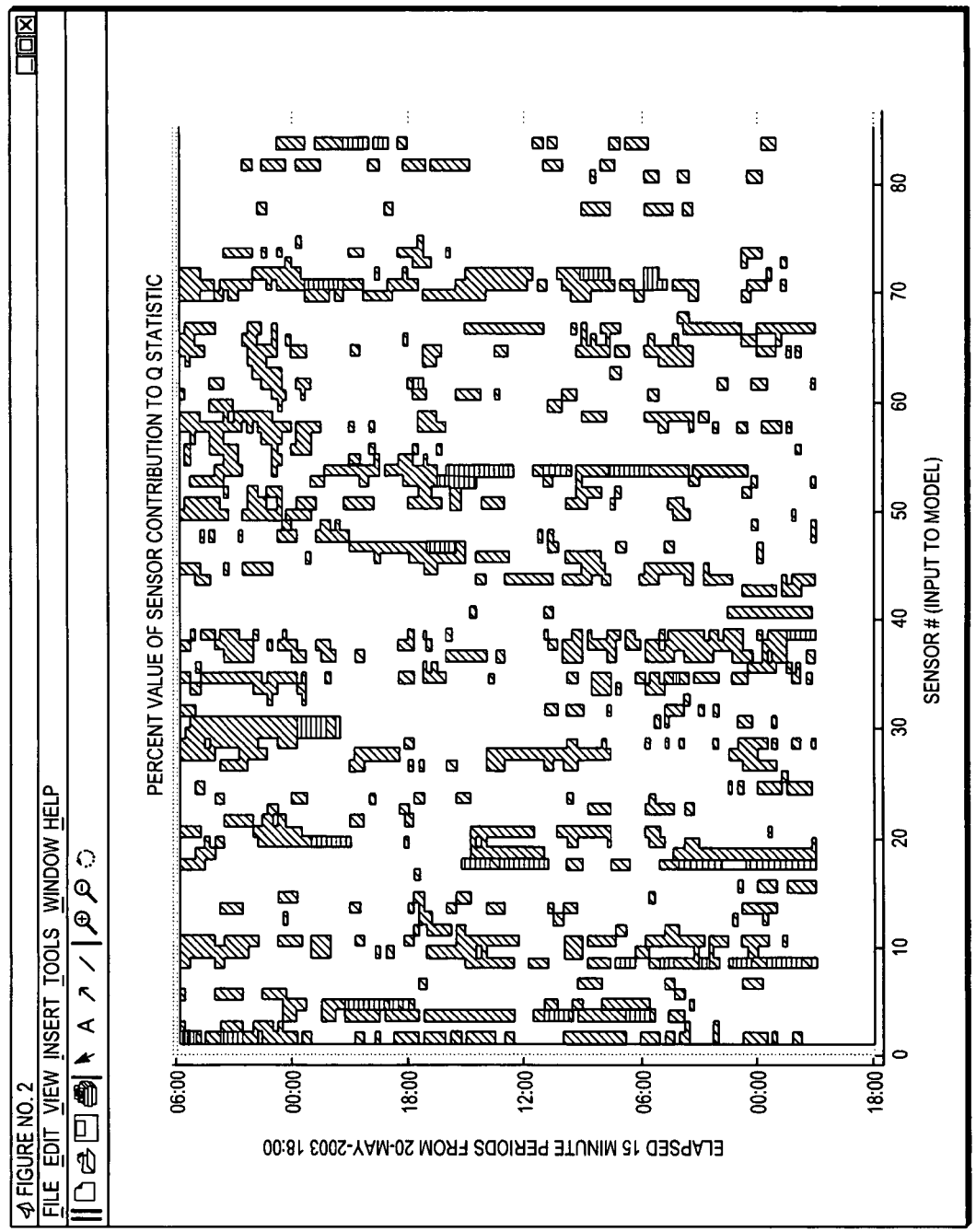
FIG. 6 illustrates a screen shot of an exemplary contributions color map display rendered utilizing the method of FIG. 5.

Method 500 of FIG. 5 was performed using the automated system of FIG. 2. The color map rendered by the method 500 is the contributions to model mismatch color map 600 of FIG. 6 which shows the individual tag contributions (process measurements from the sensors) to the Q statistic over the same time period. The color map 600 is somewhat more intuitive than that of color map 400 of FIG. 4 since the X-axis corresponds to tags, rather than scores. In this case, we see the index of the tag, rather than a tag name, along the X-axis.

Normalization for the contributions is a bit more difficult than the scores, however. In the case of the scores, Eigen values guide us in the normalization. The Q statistic, however, is an unbounded quantity, and thus the individual contributions are also unbounded. We normalized the residual contributions for this plot by calculating the percent contribution to the Q statistic at each time step. This approach has some flaws, the worst being that the overall magnitude of the Q statistic is then lost.

However, even with this limitation, the color map successfully shows is the consistent contribution of certain tags to the Q statistic, and the progression of that consistency over time. This can be difficult to assess if we are looking at snapshots of the bad actors at a single time slice. It gives a visual assessment of the distribution of bad actors over the entire incident. This can be very helpful in assessing whether the model is accurately reflecting the performance of the unit, as well as helping to diagnose a process incident. For example, in FIG. 6, various areas of the process unit are grouped together on the X axis. We can see that early in the incident, variables 9 and 18 show major deviations based on the brighter colors in these patches as we move along the Y axis (time). However, later in the incident, we see that the strongest deviations shift to variables 2 and 54. Later still, the most significant deviations move back to variable 18. This is illustrating the propagation of the disturbance around an integrated process unit. The visualization helps the operator localize the current problem, and identify potential actions to take given the current and historical state of the process.

The particular values and configurations discussed in these non-limiting examples can be varied and are cited merely to illustrate at least one embodiment and are not intended to limit the scope of the invention.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

The description as set forth is not intended to be exhaustive or to limit the scope of the invention. Many modifications and variations are possible in light of the above teaching without departing from the scope of the following claims.

It is contemplated that the use of the present invention can involve components having different characteristics. It is intended that the scope of the present invention be defined by the claims appended hereto, giving full cognizance to equivalents in all respects.

The embodiments of the invention in which an exclusive property or right is claimed are defined as follows.

Having thus described the invention what is claimed is:

1. A method for visualizing multivariate statistical measurements, implemented by a processing system, comprising:
 receiving multivariate statistical output data from a multivariate statistical model, said multivariate statistical output data comprising raw and/or post processed data;
 rendering as a color map on a display of said processing system, said multivariate statistical output data as a function of time;
 wherein rendering as a color map on a display said multivariate statistical output data as a function of time comprises:
 obtaining multivariate statistical output data at each time sample or multiple time samples;
 rendering multivariate statistical output data at each time sample or multiple time samples as a corresponding color patch on said display; wherein rendering multivariate statistical output data at each time sample or multiple time samples as a corresponding color patch on said display includes:
 mapping the magnitude of multivariate statistical output data at each time sample or multiple time samples to a corresponding color or range of colors; and
 adjusting the color of the corresponding patch to the mapped color or range or colors.

2. The method of claim 1, wherein rendering multivariate statistical output data at each time sample or multiple time samples as a corresponding color patch on said display includes:
 mapping the length of each time sample or multiple time samples to a corresponding patch height; and
 adjusting the height of the corresponding patch to the mapped patch height.

3. The method of claim 2, wherein rendering multivariate statistical output data at each time sample or multiple time samples as a corresponding color patch on said display includes:
 mapping the number of multivariate statistical output data covered by the patch to a corresponding patch width; and
 adjusting the width of the corresponding patch to the mapped patch width.

4. The method of claim 1, wherein multivariate statistical output data comprises at least one multivariate statistical output data selected from the group consisting of contributions to an overall statistical measure, scores, summary statistics, Q statistic and statistical mismatch.

5. The method of claim 4, wherein multivariate statistical output data comprises at least one multivariate statistical output data selected from the group consisting of absolute, normalized and/or averaged multivariate statistical output data.

6. The method of claim 1, wherein rendering multivariate statistical output data as a function of time as a corresponding color patch on said display comprises rendering each absolute value of normalized scores/contributions at each time sample or multiple time samples as a corresponding color patch on said display in response to a Q statistic exceeding a predetermined threshold.

7. The method of claim 1, wherein multivariate statistical output data comprises at least one Principal Component Analysis (PCA)/Partial Least Square (PLS) output data selected from the group consisting of scores normalized using a threshold function based on the Eigen values of said multivariate statistical model and contributions normalized by calculating the percent contribution.

8. The method of claim 1, wherein said multivariate statistical output model comprises a Principal Component Analysis (PCA) or Partial Least Squares (PLS) model.

9. The method of claim 1,
wherein receiving multivariate statistical output data from a multivariate statistical model comprises receiving raw data and receiving post processed data from a Principal Component Analysis (PCA) or Partial Least Squares (PLS) model, said raw data comprising contributions/scores and said post processing data comprising averaged and/or normalized said scores/contributions; and
wherein rendering said multivariate statistical output data as a function of time as a color map on a display comprises:
generating a display graphic having a first axis representing said normalized score/contribution values and a second axis representing elapsed time in time steps,
at each time step, mapping absolute score/contributions to corresponding color values in response to a Q or $T^2$ statistic exceeding a predetermined threshold;
rendering on said display graphic each normalized/score contribution value at each time sample as a corresponding color patch with said corresponding mapped color value.

10. An automated system for visualizing multivariate statistical measurements comprising:
a processor operably coupled to a display monitor;
said processor being configured to:
receive multivariate statistical output data from a multivariate statistical model, said multivariate statistical output data comprising raw and/or post processed data; and
render as a color map on said display said multivariate statistical output data as a function of time;
map the magnitude of said multivariate statistical output data at each time sample or multiple time samples to a corresponding color value or range of color values; and
adjust the color of a corresponding patch of said color map to the mapped color value or range of color values.

11. The system of claim 10, wherein said processor is configured to map the length of each time sample or multiple time samples to a corresponding patch height;
adjust the height of the corresponding patch to the mapped patch height;
map the number of multivariate statistical output data covered by the patch to a corresponding patch width; and
adjust the width of the corresponding patch to the mapped patch width.

12. The method of claim 10, wherein said multivariate statistical model comprises a Principal Component Analysis (PCA) or Partial Least Squares (PLS) model; and
wherein said multivariate statistical output data comprises at least one multivariate statistical output data selected from the group consisting of absolute, normalized, and averaged multivariate statistical output data, contributions to an overall statistical measure, scores, summary statistics, Q statistic statistical mismatch.

13. A non-transitory computer-readable media with a color map display rendering module stored thereon, which, when run on a computer system, implements a method for visualizing multivariate statistical measurements on a display monitor, the method comprising:
receiving multivariate statistical output data from a multivariate statistical model, said multivariate statistical output data comprising raw and/or post processed data; and
rendering as a color map on a display of said computer system said multivariate statistical output data as a function of time;
wherein rendering as a color map on a display said multivariate statistical output data as a function of time comprises:
obtaining multivariate statistical output data at each time sample or multiple time samples;
rendering multivariate statistical output data at each time sample or multiple time samples as a corresponding color patch on said display; and
wherein rendering multivariate statistical output data at each time sample or multiple time samples as a corresponding color patch on said display includes:
mapping the magnitude of multivariate statistical output data at each time sample or multiple time samples to a corresponding color or range of colors; and
adjusting the color of the corresponding patch to the mapped color or range of colors.

14. The rendering module of claim 13,
wherein rendering multivariate statistical output data at each time sample or multiple time samples as a corresponding color patch on said display includes:
mapping the length of each time sample or multiple time samples to a corresponding patch height; and
adjusting the height of the corresponding patch to the mapped patch height.

15. The rendering module of claim 14, wherein rendering multivariate statistical output data at each time sample or multiple time samples as a corresponding color patch on said display includes:
mapping the number of multivariate statistical model outputs covered by the patch to a corresponding patch width; and
adjusting the width of the corresponding patch to the mapped patch width.

16. The rendering module of claim 15,
wherein said multivariate statistical model comprises a Principal Component Analysis (PCA) or Partial Least Squares (PLS) model; and
wherein multivariate statistical output data comprises at least one multivariate statistical output data selected from the group consisting of absolute, normalized and averaged scores/contributions to an overall statistical measure, scores, summary statistics, Q statistic and statistical mismatch, scores normalized using a threshold function based on the Eigen values of said multivariate statistical model, and contributions normalized by calculating the percent contribution.

17. The rendering module of claim 15,
wherein said multivariate statistical model comprises a Principal Component Analysis (PCA) or Partial Least Squares (PLS) model;
wherein multivariate statistical output data comprises at least one multivariate statistical output data selected from the group consisting of wherein said multivariate statistical output data comprises absolute values of normalized scores/contributions, and further comprising rendering each absolute values of normalized scores/contributions at each time sample as a corresponding color patch on said display in response to a Q statistic exceeding a predetermined threshold.

18. The rendering module of claim 15, wherein receiving multivariate statistical output data from a multivariate statistical model, comprises receiving raw data and processed data from a Principal Component Analysis (PCA) or Partial Least Squares (PLS) model, said raw data comprising contributions/scores and said post processed data comprising averaged and/or normalized said scores/contributions; and
wherein rendering said multivariate statistical output data as a function of time as a color map on a display comprises:
generating a display graphic having a first axis representing said normalized score/contribution values and a second axis representing elapsed time in time steps,
at each time step, mapping absolute score/contributions to corresponding color values in response to a Q statistic exceeding a predetermined threshold;
rendering on said display graphic each normalized/score contribution value at each time sample as a corresponding color patch with said corresponding mapped color value.

* * * * *